United States Patent
Weidele et al.

(10) Patent No.: US 11,074,728 B2
(45) Date of Patent: Jul. 27, 2021

(54) CONDITIONAL PARALLEL COORDINATES

(71) Applicant: INTERNATIONAL BUSINESS MACHINES CORPORATION, Armonk, NY (US)

(72) Inventors: Daniel Karl I. Weidele, Cambridge, MA (US); Parikshit Ram, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/676,410

(22) Filed: Nov. 6, 2019

(65) Prior Publication Data

US 2021/0134031 A1    May 6, 2021

(51) Int. Cl.
*G09G 5/00* (2006.01)
*G06T 11/20* (2006.01)
*G06T 3/20* (2006.01)

(52) U.S. Cl.
CPC .............. *G06T 11/206* (2013.01); *G06T 3/20* (2013.01); *G06T 11/203* (2013.01); *G06T 2207/20072* (2013.01)

(58) Field of Classification Search
CPC .. G06T 11/206; G06T 11/203; G06F 3/04847; G06F 16/904; G06F 3/04842; G06F 40/18; G06F 16/221; G06F 16/26; G06F 16/283; G06F 2216/03; G06F 3/0482; G06F 40/177
See application file for complete search history.

(56) References Cited

U.S. PATENT DOCUMENTS

| | | | |
|---|---|---|---|
| 10,510,117 B1 * | 12/2019 | Romo | G06Q 40/06 |
| 2014/0247267 A1 * | 9/2014 | Kumar Kn | G16B 45/00 345/440 |
| 2017/0364253 A1 | 12/2017 | Slawinski | |
| 2018/0052597 A1 | 2/2018 | Stokes | |
| 2019/0188197 A1 | 6/2019 | Stolte | |

OTHER PUBLICATIONS

Richer, G. et al., Enabling Hierarchical Exploration for Large-Scale Multidimensional Data with Abstract Parallel Coordinates:, Hal Id: hal-01700775 (2018); Vienna, Austria, 9 pgs.
Weidele, D., "Conditional Parallel Coordinates"; arXiv:1906.07716v1 [cs.HC] Jun. 18, 2019, 5 pgs.

* cited by examiner

*Primary Examiner* — Hau H Nguyen
(74) *Attorney, Agent, or Firm* — Intelletek Law Group, PLLC; Gabriel Daniel, Esq.

(57) ABSTRACT

A conditional parallel coordinate visualization system is provided. The system presents a parallel coordinate visualization that includes a set of parallel main axes that respectively correspond to a set of main dimensions. The system receives a first multivariate data including values at the set of main dimensions. The first multivariate data has a first additional data that includes values in a first set of sub-dimensions. The first set of sub-dimensions is associated with a first predicate value at a first predicate dimension in the set of main dimensions. The system presents the first multivariate data as a polyline that intersects the set of parallel main axes. Upon a selection of an option item, the system unfolds the parallel coordinate visualization to reveal a first set of parallel sub-axes that correspond to the first set of sub-dimensions. The system presents the first additional data at the first set of parallel sub-axes.

20 Claims, 8 Drawing Sheets

CONDITIONAL PARALLEL COORDINATES

BACKGROUND

Technical Field

The present disclosure generally relates to data visualization.

Description of the Related Arts

Parallel Coordinates (PC) are a fundamental technique to visualize multivariate data. Multivariate data are multi-dimensional observations with values typically drawn from different scales and types. In its most basic form, PC visualizations map each dimension to a vertical axis, and then draw each observation as a horizontal polyline. Lines intersect an axis at where the data value can be found on the axis. Nominal or categorical values can be treated accordingly, ordered depending on the application.

SUMMARY

Some embodiments of the disclosure provide a conditional parallel coordinate visualization system. The system presents a parallel coordinate visualization that includes a set of parallel main axes that respectively correspond to a set of main dimensions. The system receives a first multivariate data including values at the set of main dimensions. The first multivariate data has first additional data that includes values in a first set of sub-dimensions. The first set of sub-dimensions is associated with a first predicate value at a first predicate dimension in the set of main dimensions. The system presents the first multivariate data as a first polyline that intersects the set of parallel main axes. Upon a selection of a first option item, the system unfolds the parallel coordinate visualization to reveal a first set of parallel sub-axes that correspond to the first set of sub-dimensions. The system presents the first additional data of the first multivariate data at the first set of parallel sub-axes.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a data visualization method that adapt Parallel Coordinates (PC) for conditional data, or Conditional Parallel Coordinate (CPC) visualization. Conditional data is additional data that exist and can be visualized or observed when a set of criteria is met. In some embodiments, a PC visualization is extended to include the conditional data when the set of criterial is met. In some embodiments, the existence or visualization of the additional information is conditioned or predicated upon a particular variable at a specific dimension (predicate dimension) being a specific value (predicate value) or within a range.

Generally, conditional data is formalized according to the following. Consider a set of predicates $C:=\{C_1, \ldots, C_k\}$ on d-dimensional observation $o \in O$, where $O:=\{D_1 \times \ldots \times D_d\}$ for some multivariate $D_j \in \{\mathbb{N}, \mathbb{R}, \{0,1\}\}$ and $j \in [1,d]$:

$C_i: O \rightarrow \{\text{true,false}\}$, with $i \in [1,k]$.

Let further $O_{C_i}$ be the subset of observations for which $C_i$ holds:

$O_{C_i} := \{o \in O | C_i(o) = \text{true}\}$

The conditional data is the union of tuples $(o_i, \hat{o}_i)$ where $o_i \in O_{C_i}$ and $\hat{o}_i \in \hat{O}_i$, $\hat{O}_i = \Pi_{l=1}^{e_i} D_l$ some additional $e_i$-dimensional multivariate observation:

$\mathcal{C} := U_{i=1}^{k} (o_i, \hat{o}_i)$.

In other words, if criteria or a predicate is met for an observation, the observation may be augmented with additional information. Yet, such additional information does not exist in cases where the predicate does not hold. The process can be further recursed by setting $O = \mathcal{C}$ and defining more predicates. For some embodiments, the predicate is limited to a single variable, thus conceptually binding the additional information to a specific value or range of that variable. With additional information $ô_i$ being bounded to a single value or range, the additional information $ô_i$ can be optionally unfolded or expanded when a user selects a corresponding graphical element (also referred to as an option), in a PC visualization.

Figure 1:
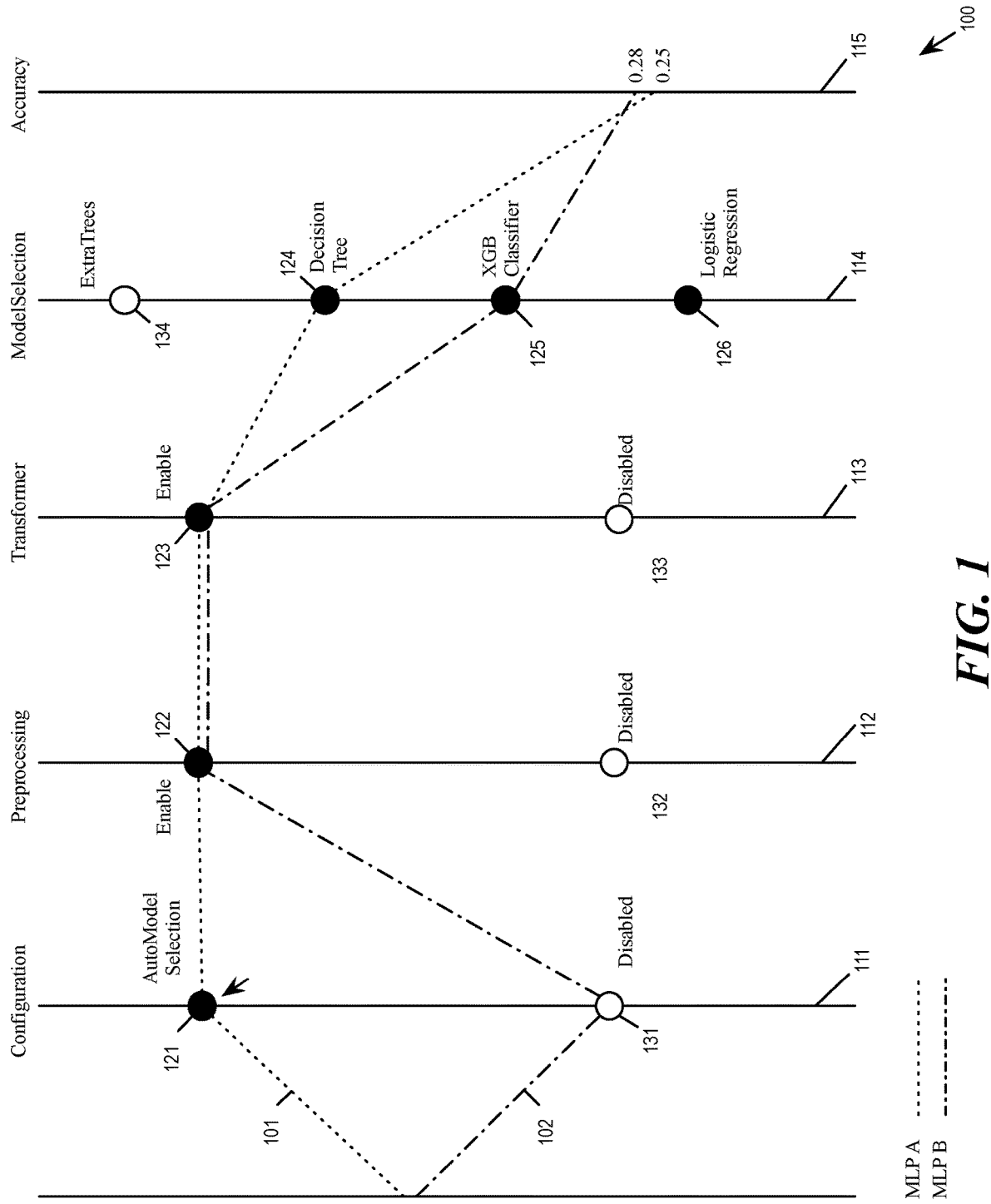
FIG. 1 illustrates a conditional parallel coordinate (CPC) visualization of multivariate data, in which graphical elements provide options for unfolding the visualization to reveal additional information.

FIG. 1 illustrates a conditional parallel coordinate (CPC) visualization of multivariate data, in which graphical elements provide options for unfolding the visualization to reveal additional information. The figure illustrates the graphical display or output of a computing device. The computing device has received several multivariate data, including multivariate data for Machine Learning Pipeline (MLP) A and multivariate data for MLP B, and is presenting the received multivariate data in a CPC visualization 100.

As illustrated, the CPC visualization 100 shows multiple axes 111-115 that respectively correspond to a set of dimensions that include "configuration", "preprocessing", "transformer", "model selection", accuracy", etc. The multiple axes are drawn parallel to each other (and hence referred to as "parallel axes"). Each plotted multivariate data has values at each of these dimensions. Each multivariate data is represented by a polyline that intersects each of the parallel axes 111-115. An intersection of the polyline with an axis represents the value of the multivariate data at the corresponding dimension. For example, the multivariate data for MLP A is represented by a polyline 101, which intersects the parallel axes for dimensions "configuration" (111), "preprocessing" (112), "transformer" (113), "model selection" (114), accuracy" (115) at values "AutoModelSelection", "Enable", "Enable", "Decision Tree", "0.25", respectively. Likewise, the multivariate data for MLP B is represented by a polyline 102, which intersects the same parallel axes 111-115 at values "Disabled", "Enable", "Enable", "XGB Classifier", and "0.28", respectively. These parallel axes 111-115 are present for all multivariate data without any predicate. They are therefore referred to as "main" axes. The dimensions represented by the parallel main axes are in turn referred to as "main" dimensions.

The multivariate data for MLP A and MLP B are conditional multivariate data. In other words, the multivariate data for MLP A and MLP B have additional data at sub-dimensions in addition to the data at the main dimensions. A set of additional data (i.e., $ô_i$) of a conditional multivariate data is associated with a predicate value or range in one of the main dimensions (referred to as a predicate dimension). However, these additional data of the conditional multivariate data MLP A and MLP B are hidden and not shown in the CPC visualization 100 in FIG. 1. Specifically, the CPC visualization 100 in FIG. 1 presents a collapsed view in which all of the sub-dimensions are hidden.

The CPC visualization 100 presents several graphical elements that each provide an option for unfolding a set of sub-dimensions, represented by a set of parallel sub-axes. An option element represents a predicate value for a set of associated sub-dimensions. A predicate value may be a categorical value (e.g., Enabled, Disabled), a numerical value, or a range of values that serve as the predicate for the set of sub-dimensions. Each option element is positioned at or near the main axis of the associated predicate value or range. FIG. 1, shows several option elements 121-126 that correspond to predicate values for different sets of sub-dimensions. For example, the option element 121 at the main axis 111 corresponds to the predicate value "AutoModelSelection" at "configuration" dimension, the option element 122 at main axis 112 corresponds to the predicate value "Enable" at "preprocessing" dimension, the option element 123 at main axis 113 corresponds to the predicate value "Enable" at "Transformer" dimension, etc. Each of these option elements can be selected by the user to unfold a set of sub-axes for displaying a set of additional data for a conditional multivariate data. In FIG. 1, each of the option elements 121-126 is illustrated as a darkened circle, indicating that each option element can be selected to reveal a set of sub-axes. On the other hand, values or ranges that are not predicate for sub-dimensions are illustrated with either blank circles (e.g., elements 131-134) or no circle at all, indicating they are not associated with or predicates for any sub-dimensions.

Figure 2:
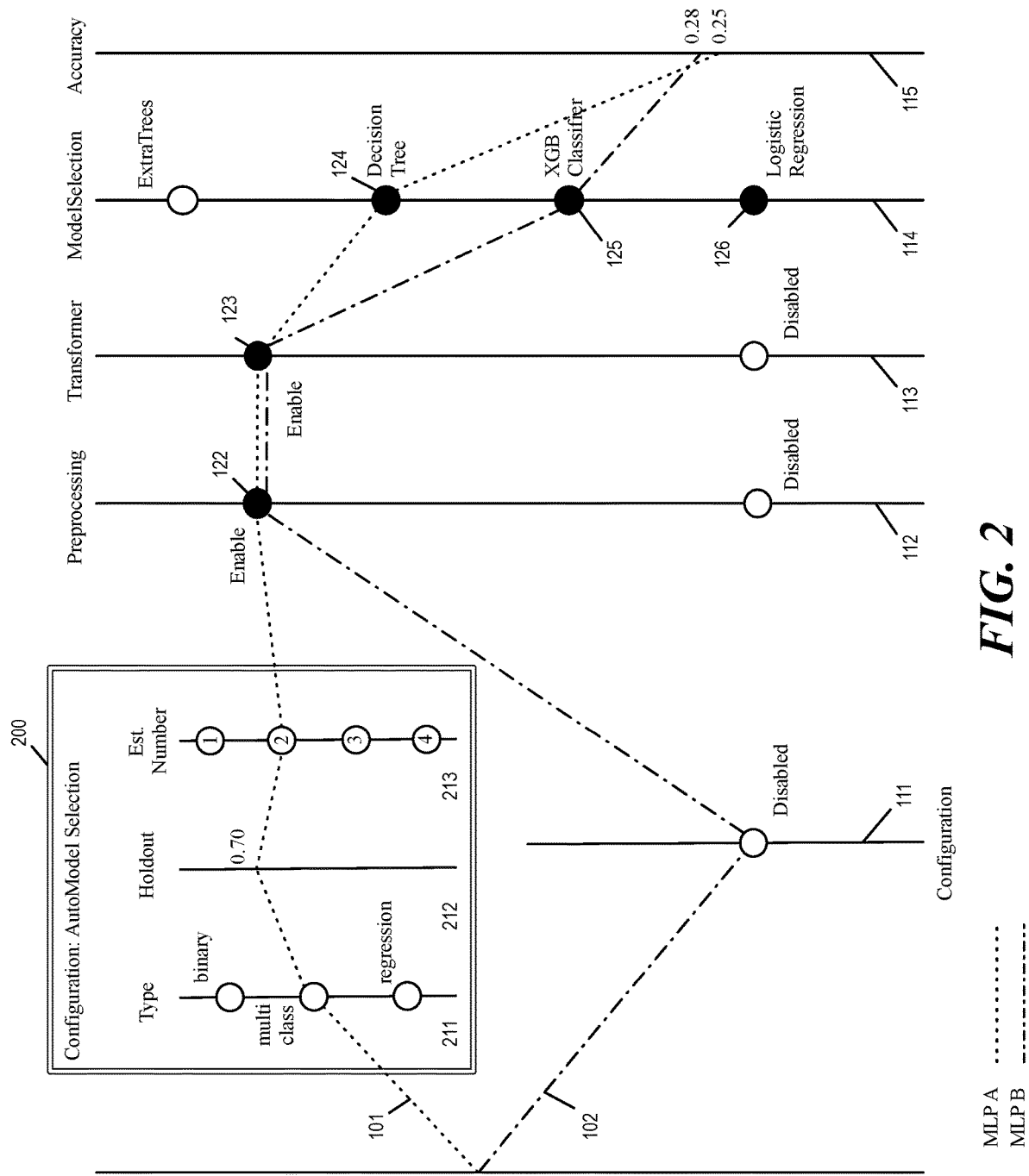
FIG. 2 illustrates unfolding a set of sub-axes for a set of sub-dimensions when a corresponding option element in the CPC visualization is selected.

FIG. 2 illustrates unfolding a set of sub-axes for a set of sub-dimensions when a corresponding option element in the CPC visualization 100 is selected. In the example, the option element 121 at the main axis 111 is selected, and the CPC visualization 100 correspondingly unfolds or reveals a set of parallel sub-axes 211-213 in an area 200. As illustrated, the sub-axis 211 corresponds to a sub-dimension "type", the sub-axis 212 corresponds to sub-dimension "holdout", and the sub-axis 213 corresponds to a sub-dimension "Est. Number". These sub-dimensions are associated with predicate value "AutoModelSelection" at predicate dimension "Configuration" (main axis 111), and the unfolded sub-axes 211-213 are displayed over or near the option element 121.

The polyline 101, which intersects the option element 121, also intersects each of the parallel sub-axes 211-213, indicating that the multivariate data of MLP A has additional data for sub-dimensions "type", "holdout", and "Est. Number". Specifically, the polyline 101 intersects the sub-axis 211 at value "multiclass", sub-axis 212 at value "0.70", and sub-axis 213 at value "2". The polyline 102 does not intersect the unfolded parallel sub-axes 211-213, indicating that the multivariate data of MLP B has no additional data for sub-dimensions "type", "holdout" and "Est. Number".

Figure 3:
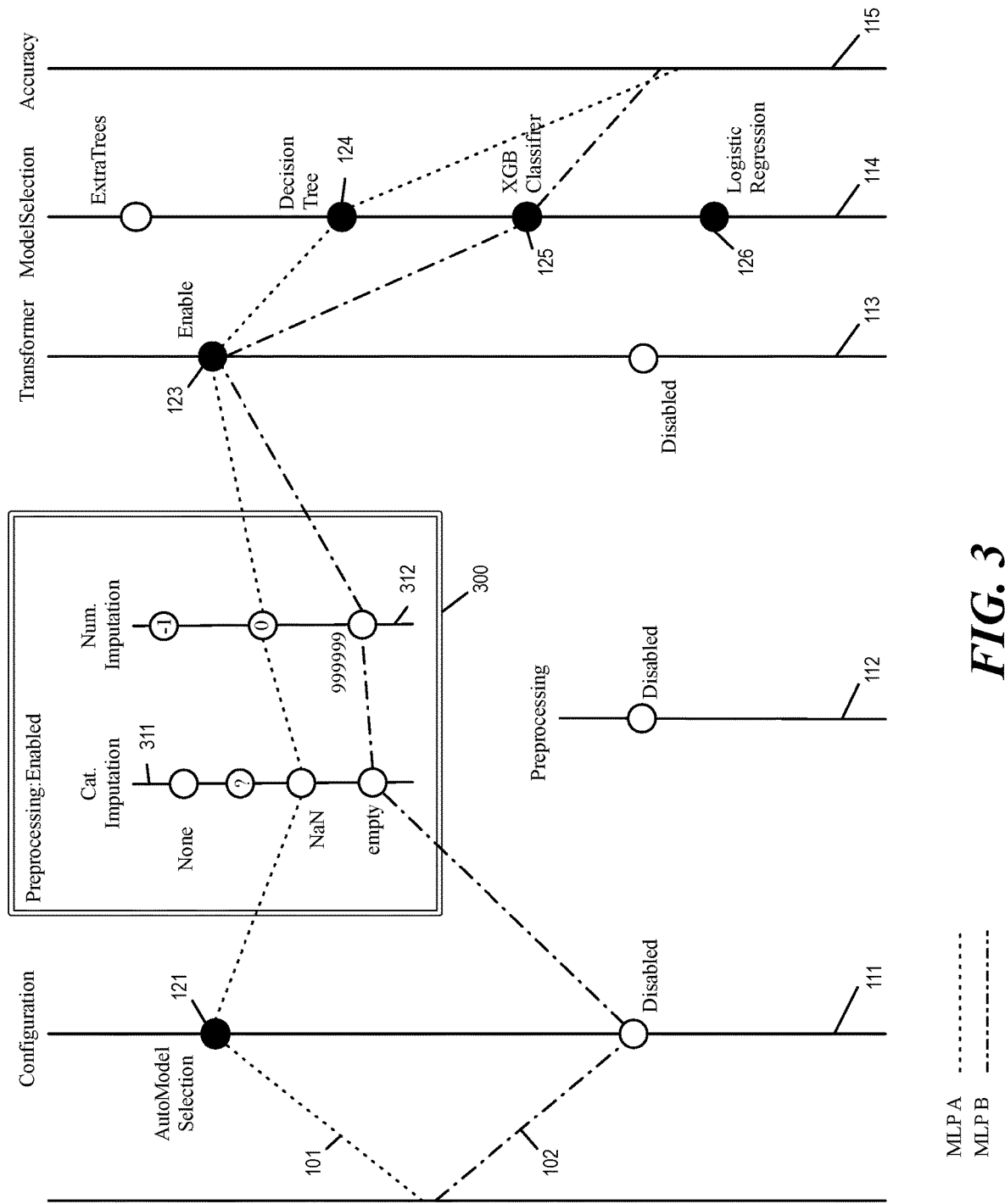
FIG. 3 illustrates the CPC visualization unfolding a set of unfolded sub-axes that are intersected by two or more multivariate data.

FIG. 3 illustrates the CPC visualization 100 unfolding a set of unfolded sub-axes that are intersected by two or more multivariate data. In the example, the option element 122 at the main axis 112 is selected, and the CPC visualization 100 correspondingly unfolds a set of parallel sub-axes 341-342 in an area 300. The set of parallel sub-axes 341-342 are associated with or predicate on the value "Enable" at axis "Preprocessing". Both the polyline 101 and the polyline 102 intersect the sub-axes 341-342 in an area 300, indicating they both have additional data at sub-dimensions "Cat. Imputation" and "Num. Imputation". The polyline 101 intersects the sub-axis 341 at value "NaN" and sub-axis 342 at value "0". The polyline 102 intersect the sub-axis 341 at value "empty" and sub-axis 342 at value "999999."

Figure 4:
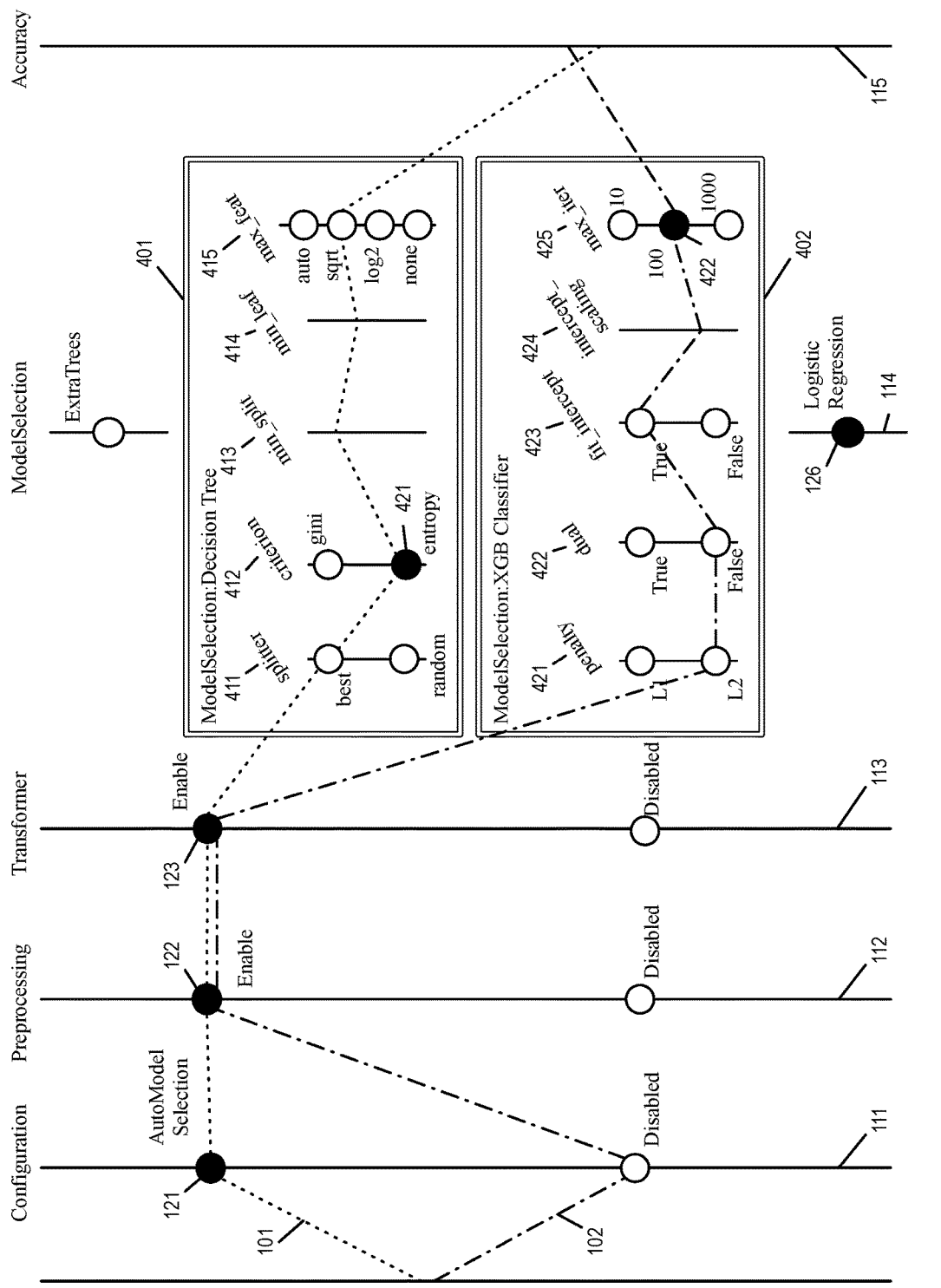
FIG. 4 illustrates the CPC visualization unfolding multiple sets of sub-axes that are associated with or predicated on different values.

FIG. 4 illustrates the CPC visualization 100 unfolding multiple sets of sub-axes that are associated with or predicated on different values. In the example, both the option elements 124 and 125 at the main axis 114 are selected. The selection of the option element 124 unfolds a set of parallel sub-axes 411-415 that are associated with the predicate value "decision tree" of the predicate dimension "ModelSelection", in an area 401. The selection of the option element 125 unfolds a set of parallel sub-axes 421-425 that are associated with the predicate value "XGB Classifier" of the predicate dimension "ModelSelection", in an area 402.

The polyline 101 intersects each of the parallel sub-axes 411-415 because the multivariate data for MLP A has additional data for sub-dimensions "splitter", "criterion", "min_split", "min_leaf", and "max_feat". Likewise, the polyline 102 intersects each of the parallel sub-axes 421-425 because the multivariate data for MLP B has additional data for sub-dimensions "penalty", "dual", "fit intercept", "intercept scaling", and "max_iter".

The CPC visualization 100 unfolds both the set of parallel sub-axes 411-415 and the set of parallel sub-axes 421-425 in the same display. The set of parallel sub-axes 411-415 are unfolded near or over a position based on their associated predicate value "DecisionTree". The set of parallel sub-axes 421-425 are unfolded near or over a position based on their associated predicate value "XGB Classifier". Both the set of parallel sub-axes 411-415 and the set of parallel sub-axes 421-425 are displayed along the same main axis 114, since the corresponding main dimension "ModeSelection" is the predicate dimension for both sets of parallel sub-axes.

In some embodiments, for categorical values along parallel main axes, the CPC visualization 100 initially space out the categorical values equally, offsetting them by half a height. Then, a canvas for the additional information ($ô_i$) can be placed centered on top of an option element (or a selected range), such that there is no overlap between the different sets of sub-dimensions along the y-axis upon expansion. To accommodate the increased space requirement on the x-axis, in some embodiments, the CPC visualization 100 sums a weight w over all visible dimensions, recursively stepping into branched options. In the predicate-free or collapsed trivial case (e.g., FIG. 1), w is set to 1. For dimensions with multiple expanded branches (e.g., FIG. 4) w is set to the maximum. Depending on the application w can be chosen more fine-grained.

The CPC visualization 100 also allows nested unfolding, i.e., a value (categorical, numerical, or range) along a sub-axis may serve as the predicate value for a set of sub-sub-axes. In the example of FIG. 4, the numerical value "100" in the sub-axis 425 and the categorical value "entropy" in the sub-axis 412 are illustrated by darkened circles 421 and 422, indicating that they are both option elements for predicate values that can be selected as option elements to unfold a set of sub-sub-axes.

Figure 5:
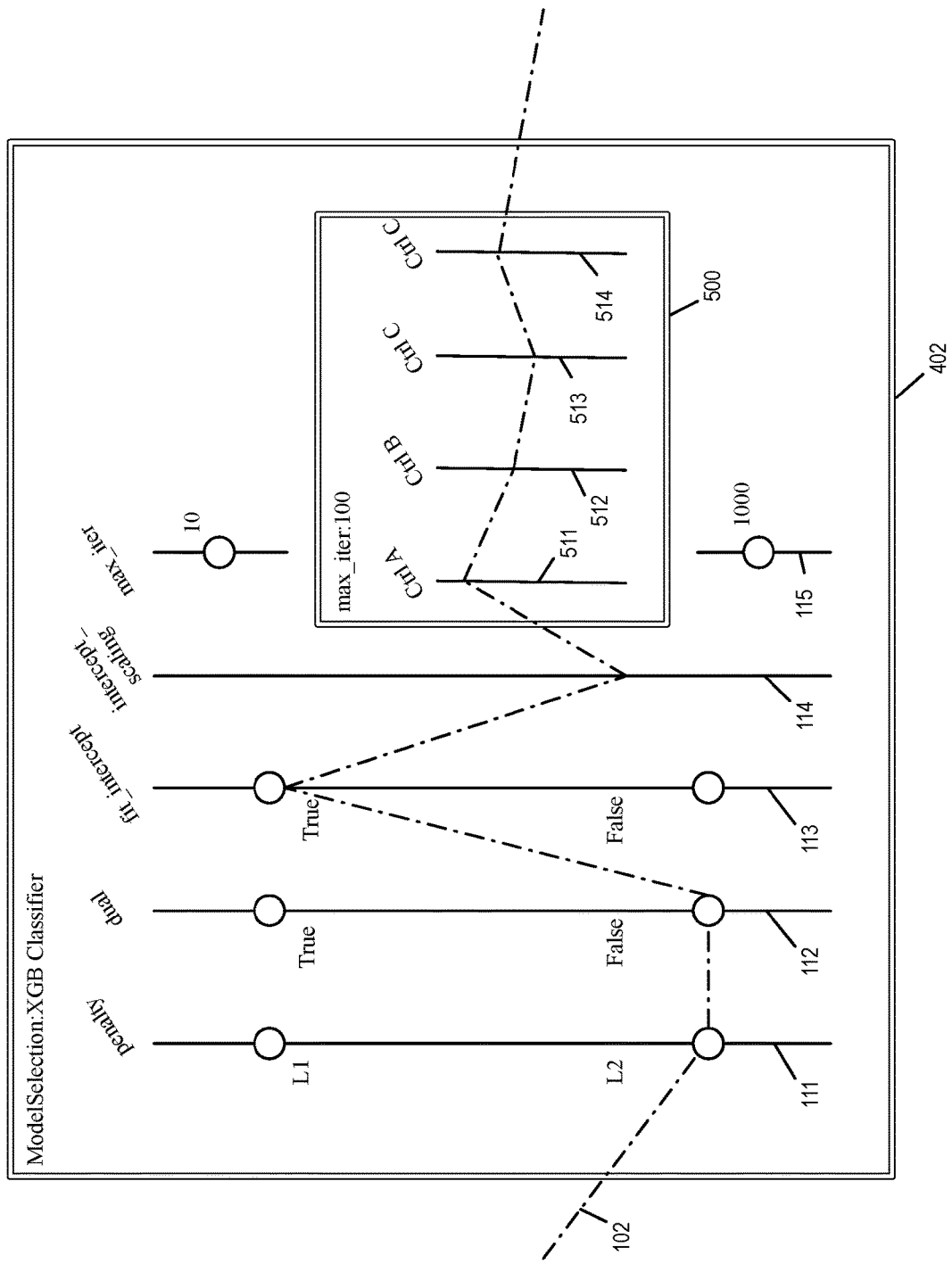
FIG. 5 illustrates the nested unfolding of a set of parallel sub-sub-axes based on a predicate value on a sub-axis.

FIG. 5 illustrates the nested unfolding of a set of parallel sub-sub-axes based on a predicate value on a sub-axis. Specifically, the option element 402 for the predicate value "100" on sub-axis 425 ("max_iter") is selected to unfold a set of sub-parallel sub-axes 511-514 in an area 500. As illustrated, the set of sub-parallel sub-axes correspond to sub-sub-dimensions "Ctrl A", "Ctrl B", "Ctrl C", and "Ctrl D" that are associated with or predicated on the predicate value "100" of "max_ter". In FIG. 4, the polyline 102 for MLP B intersects the option element 402. In FIG. 5, the polyline 102 for MLP B intersects the parallel sub-sub-axes 511-514 at various numerical values.

In some embodiments, the CPC visualization 100 provides an edit mode to allow editing or creating multivariate data. For example, the user interface of the CPC visualization 100 can be used to draw a polyline to intersect the parallel main axes and/or any parallel sub-axes or sub-sub-axes. The values of the multivariate data at various main dimensions and sub-dimensions (and/or any sub-sub-dimensions) may be modified or edited when the user interface is used to manipulate polylines to change the intersections at various parallel main axes and/or any parallel sub-axes or sub-sub-axes.

In some embodiments, the CPC visualization 100 enhances the visualization by highlighting one or more polylines of one or more multivariate data. In some embodiments, the CPC visualization 100 may highlight a selected bundle of polylines. In some embodiments, the CPC visualization 100 may highlight all polylines that intersect a selected (e.g., hovered) categorical or numerical value at a particular main axis, sub-axis, or sub-sub-axis. In some embodiments, two or more categorical or numerical values may be selected, and the CPC visualization 100 highlights all polylines that intersect all of the selected categorical or numerical values.

FIGS. 1-5 show examples of using CPC for visualizations of automatic machine learning (AutoML). AutoML typically assembles individual algorithmic blocks into a pipeline, and then fine-tunes hyperparameters of the algorithmic blocks. PC is not capable of showing the pipeline and hyperparameters simultaneously. CPC on the other hand may be applied to rendering the pipeline steps sequentially (e.g., from left to right), and with predicates to be of the form "equal to block ID". If a pipeline matches a predicate, the block is augmented with corresponding sub-dimensions showing its hyperparameter settings. CPC visualization shows details about hyperparameters while preserving the context. In the examples of FIGS. 1-5, some of the parallel axes are performance measurements, and the user interface can be used to hover over a high accuracy pipeline and learn about the configuration of the AutoML pipeline. If AutoML has not tested certain configurations (e.g., when stuck in local minima), the user can leverage the edit mode of CPC visualization 100 to close the feedback loop and to inform a search algorithm about a new initial configuration.

Conversational agents have become more and more commonplace and is continuing to replace real world service help desks. Companies accumulate transcripts of chat sessions to further improve their customer experience. CPC visualization can be used to gain new insights into such data. For example, a pizza booth chat bot may have the following data mapped to the main axes of CPC: a number of axes for food items (with options: soft drink, pizza, salad, dessert, pasta), an axis for delivery type (self-pickup, eat-in, delivery) and an axis for the payment option (cash, credit card, online payment solutions, etc.). Exploring the chat session results in polylines of a CPC visualization that can inform the user about trends in the data, especially when further filtered for a certain day, week or month.

Figure 6A:
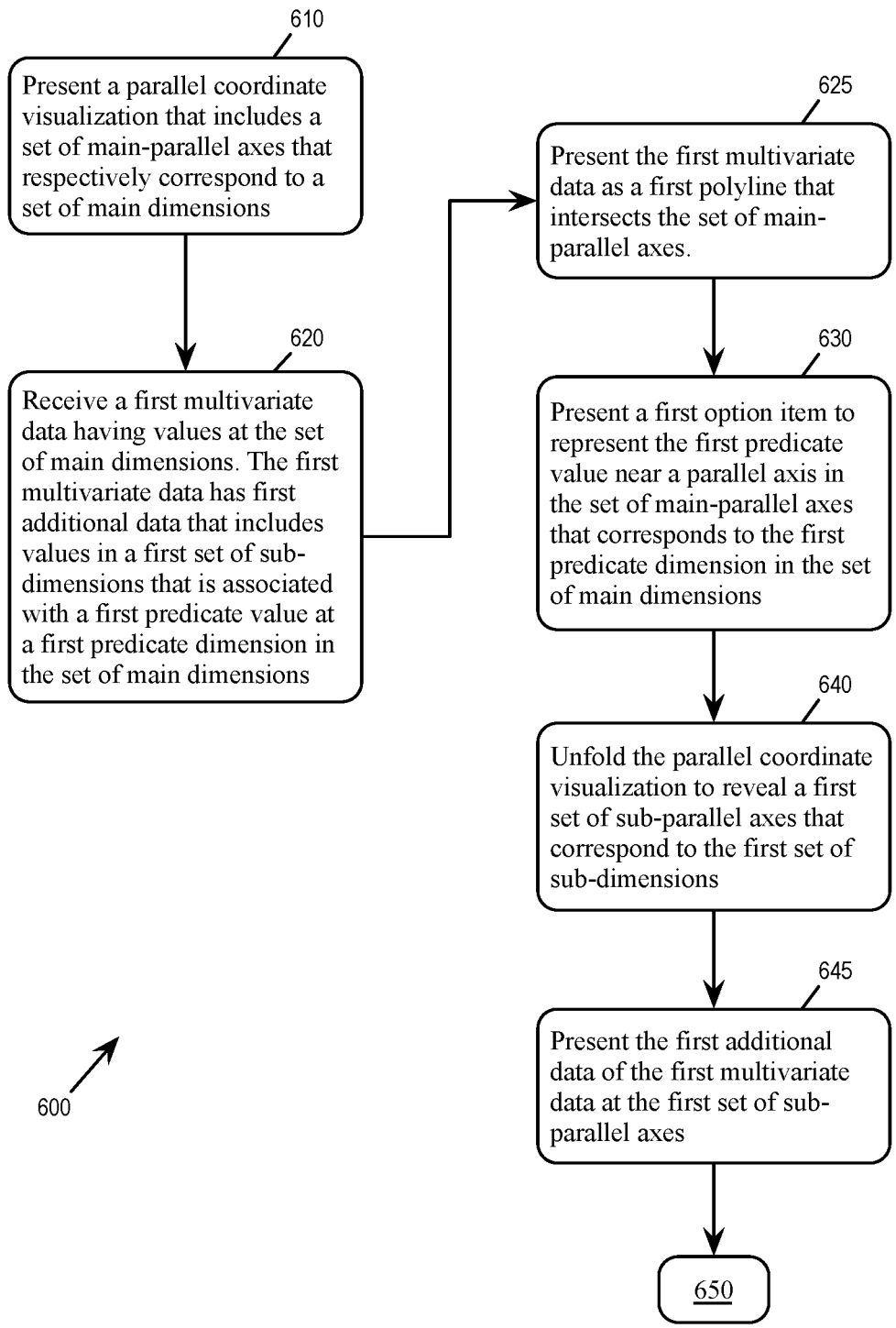
FIGS. 6a-b conceptually illustrate a process performed by a computing system that implements a CPC visualization, consistent with an exemplary embodiment.
Figure 6B:
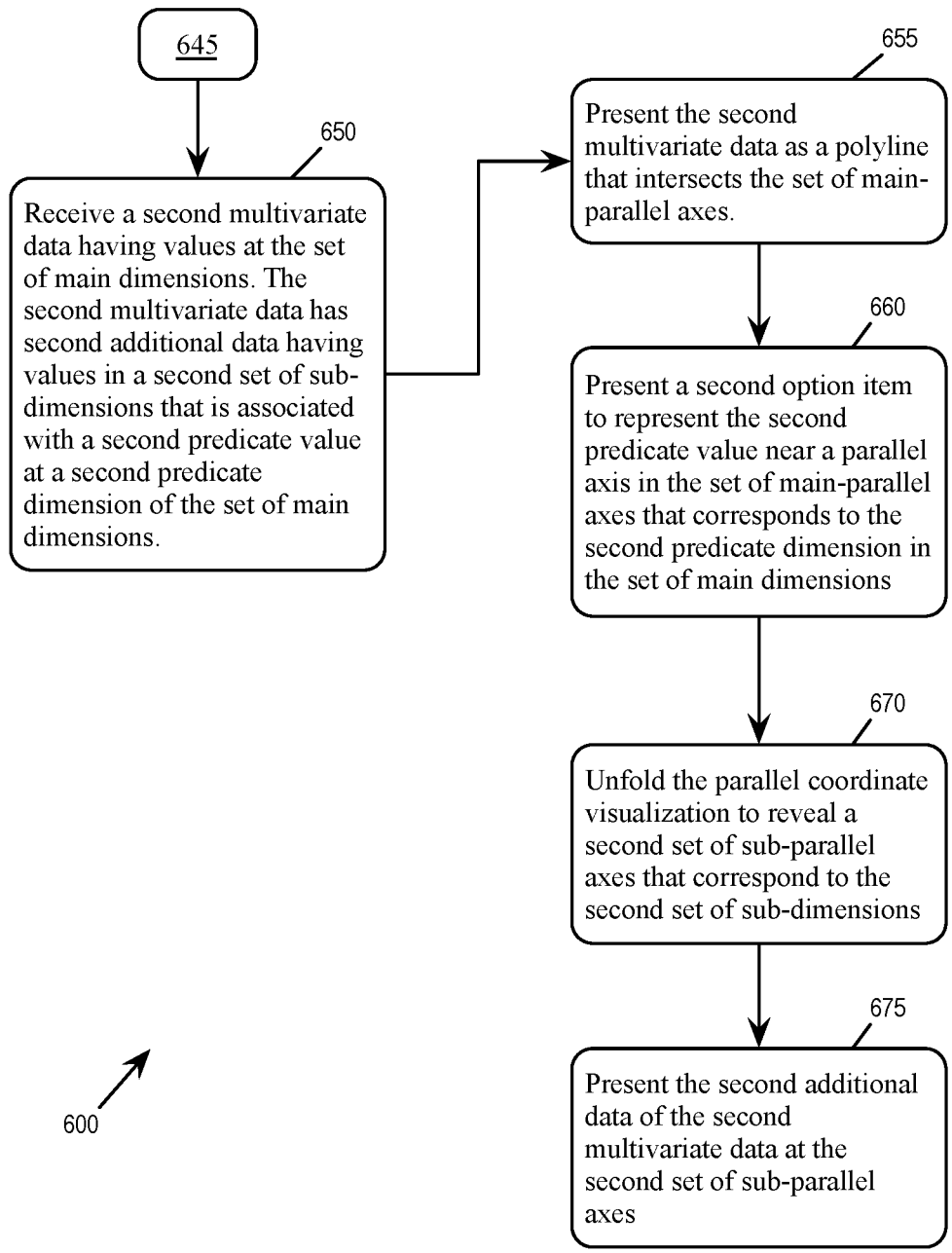

FIGS. 6a-b conceptually illustrate a process 600 performed by a computing system that implements a conditional parallel coordinate (CPC) visualization, consistent with an exemplary embodiment. In some embodiments, one or more processing units (e.g., processor) of a computing device implementing the CPC visualization 100 perform the process 600 by executing instructions stored in a computer readable medium.

The system presents (at step 610) a parallel coordinate visualization that includes a set of parallel main axes (e.g., main axes 111-115) that respectively correspond to a set of main dimensions. The system receives (at step 620) a first multivariate data (e.g., MLP A) having values at the set of main dimensions. The first multivariate data has first additional data that includes values in a first set of sub-dimensions. The first set of sub-dimensions is associated with a first predicate value at a first predicate dimension in the set of main dimensions.

The system presents (at step 625) the first multivariate data as a first polyline that intersects the set of parallel main axes. The system presents (at step 630) a first option item to represent the first predicate value near a parallel axis in the set of parallel main axes that corresponds to the first predicate dimension in the set of main dimensions.

The system, upon a selection of the first option item, unfolds (at step 640) the parallel coordinate visualization to reveal a first set of parallel sub-axes that correspond to the first set of sub-dimensions. The system presents (at step 645)

the first additional data of the first multivariate data at the first set of parallel sub-axes. The system may unfold the parallel coordinate visualization to reveal the first set of parallel sub-axes by visually expanding the first predicate dimension to encompass the first set of parallel sub-axes. The first set of parallel sub-axes and the set of parallel main axes are interconnected by the first polyline representing the first multivariate data.

The system receives (at step 650) a second multivariate data having values at the set of main dimensions. The second multivariate data has second additional data comprising values in a second set of sub-dimensions. The second set of sub-dimensions is associated with a second predicate value (or range) at a second predicate dimension of the set of main dimensions. The system presents (at step 655) the second multivariate data as a second polyline that intersects the set of parallel main axes.

The system presents (at step 660) a second option item to represent the second predicate value near a parallel axis in the set of parallel main axes that corresponds to the second predicate dimension of the set of main dimensions.

The system, upon a selection of the second option item, unfolds (at 670) the parallel coordinate visualization to reveal a second set of parallel sub-axes that correspond to the second set of sub-dimensions. The system presents (at step 675) the second additional data of the second multivariate data at the second set of parallel sub-axes. The system may unfold the parallel coordinate visualization to reveal the first and second sets of parallel sub-axes by (i) visually expanding the first predicate dimension to encompass the first set of parallel sub-axes near (based on the position of) the first predicate value and (ii) visually expanding the second predicate dimension to encompass the second set of parallel sub-axes near (based on the position of) the second predicate value.

The first and second predicate dimensions may be different. For example, the predicate dimension of sub-dimensions 211-213 is "Configuration", while the predicate dimension of sub-dimensions 311-312 is "Preprocessing".

The first and second sets of sub-dimensions maybe identical. For example, the multivariate data for both MLP A and MLP B have additional data in sub-dimensions 311-312.

The first and second predicate dimensions maybe identical, while the first and second predicate values are different, and the first and second sets of sub-dimensions are different. For example, the set of sub-dimensions 411-415 and the set of sub-dimensions 421-425 are different, have different predicate values ("Decision Tree" vs. "XGB classifier"), but the different predicate values fall on the same predicate dimension (main axis 114 "Model Selection").

Though not illustrated as blocks in the process 600, a computing system implementing a CPC visualization may receive additional multivariate data, unfold additional parallel sub-axes, and/or unfold nested parallel sub-sub-axes. The computing system may also allow editing and/or creation of polylines that represent multivariate data.

By virtue of the CPC visualization technology discussed herein, data can be displayed on a user interface of a computer system in a more efficient way. Specifically, the CPC visualization allows the computing system to efficiently present multivariate data with a large set of dimensions, such as a pipeline of hyperparameters. The CPC visualization allows different values at the large set of dimensions to be plotted on a flat screen of the computer system in an easy-to-understand format. The CPC visualization also allows additional data that are predicated on a predicated value to be unfolded only when an option element is selected, thereby conserving display area of the computing system.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
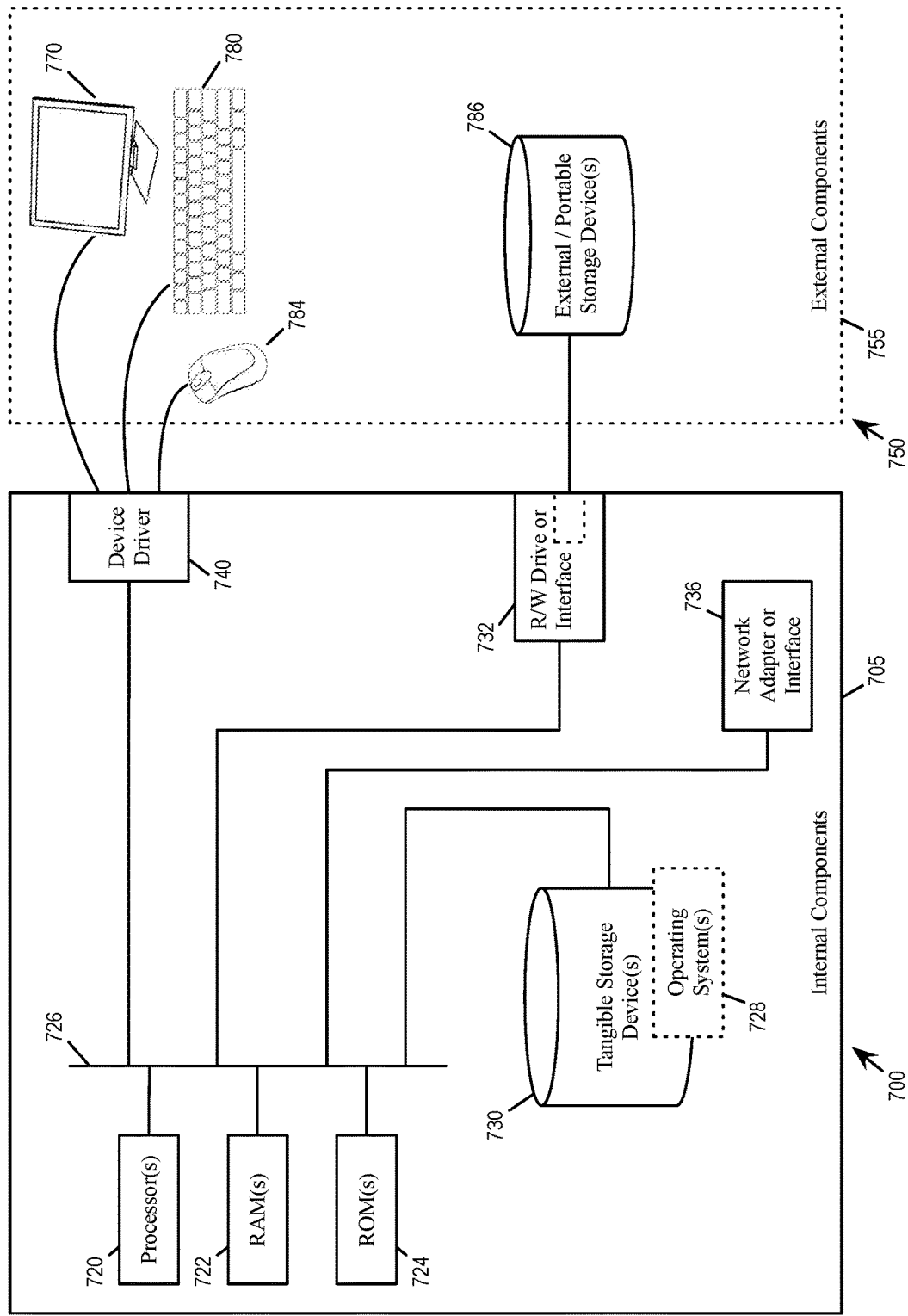
FIG. 7 shows a block diagram of the components of a data processing system in accordance with an illustrative embodiment of the present disclosure.

FIG. 7 shows a block diagram of the components of data processing systems 700 and 750 that may be used to implement Conditional Parallel Coordinate visualization in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the process $0600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the process $0600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

The foregoing one or more embodiments implements a CPC visualization system within a computer infrastructure by having one or more computing devices visualizing multivariate data as polylines intersecting a set of parallel axes that represent a set of main dimensions. The computer infrastructure is further used to unfold a set of parallel sub-axes for visualizing additional data at the set of sub-dimensions that are associated with or predicated on a predicate value at a predicate dimension.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   presenting a parallel coordinate visualization that comprises a set of parallel main axes that respectively correspond to a set of main dimensions;
   receiving a first multivariate data comprising values at the set of main dimensions, wherein the first multivariate data has first additional data comprising values in a first set of sub-dimensions, the first set of sub-dimensions associated with a first predicate value at a first predicate dimension in the set of main dimensions;
   presenting the first multivariate data as a first polyline that intersects the set of parallel main axes;
   unfolding the parallel coordinate visualization to reveal a first set of parallel sub-axes that correspond to the first set of sub-dimensions upon receiving a selection of a first option item; and
   presenting the first additional data of the first multivariate data at the first set of parallel sub-axes, wherein the first polyline also intersects each of the parallel sub-axes that correspond to the first set of sub-dimensions.

2. The computer-implemented method of claim 1, wherein unfolding the parallel coordinate visualization to reveal the first set of parallel sub-axes comprises visually expanding the first predicate dimension to encompass the first set of parallel sub-axes.

3. The computer-implemented method of claim 1, wherein the first set of parallel sub-axes and the set of parallel main axes are interconnected by the first polyline representing the first multivariate data.

4. The computer-implemented method of claim 1, further comprising receiving a second multivariate data comprising values at the set of main dimensions,
   wherein the second multivariate data has second additional data comprising values in a second set of sub-dimensions, and
   wherein the second set of sub-dimensions is associated with a second predicate value at a second predicate dimension of the set of main dimensions.

5. The computer-implemented method of claim 4, further comprising:
   presenting a second option item to represent the second predicate value near a parallel axis in the set of parallel main axes that corresponds to the second predicate dimension of the set of main dimensions;
   unfolding the parallel coordinate visualization to reveal a second set of parallel sub-axes that correspond to the second set of sub-dimensions upon a selection of the second option item; and
   presenting the second additional data of the second multivariate data at the second set of parallel sub-axes.

6. The computer-implemented method of claim 5, wherein unfolding the parallel coordinate visualization to reveal the first and second sets of parallel sub-axes comprises:
   visually expanding the first predicate dimension to encompass the first set of parallel sub-axes near the first predicate value; and
   visually expanding the second predicate dimension to encompass the second set of parallel sub-axes near the second predicate value.

7. The computer-implemented method of claim 6, wherein the first and second predicate dimensions are different.

8. The computer-implemented method of claim 6, wherein the first and second predicate dimensions are identical.

9. The computer-implemented method of claim 1, wherein the first option item is presented near the first predicate value near a parallel axis in the set of parallel main axes that corresponds to the first predicate dimension in the set of main dimensions.

10. A computer program product comprising:
    one or more non-transitory computer-readable storage devices and program instructions stored on at least one of the one or more non-transitory storage devices, the program instructions executable by a processor, the program instructions comprising sets of instructions for:
    presenting a parallel coordinate visualization that comprises a set of parallel main axes that respectively correspond to a set of main dimensions;
    receiving a first multivariate data comprising values at the set of main dimensions, wherein the first multivariate data has first additional data comprising values in a first set of sub-dimensions, the first set of sub-dimensions associated with a first predicate value at a first predicate dimension in the set of main dimensions;
    presenting the first multivariate data as a first polyline that intersects the set of parallel main axes;
    unfolding the parallel coordinate visualization to reveal a first set of parallel sub-axes that correspond to the first set of sub-dimensions upon receiving a selection of a first option item; and
    presenting the first additional data of the first multivariate data at the first set of parallel sub-axes, wherein the first polyline also intersects each of the parallel sub-axes that correspond to the first set of sub-dimensions.

11. The computer program product of claim 10, wherein unfolding the parallel coordinate visualization to reveal the first set of parallel sub-axes comprises visually expanding the first predicate dimension to encompass the first set of parallel sub-axes.

12. The computer program product of claim 10, wherein the first set of parallel sub-axes and the set of parallel main axes are interconnected by the first polyline representing the first multivariate data.

13. The computer program product of claim 10, wherein the first option item is presented near the first predicate value near a parallel axis in the set of parallel main axes that corresponds to the first predicate dimension in the set of main dimensions.

14. The computer program product of claim 10, wherein the program instructions further comprise sets of instructions for:
receiving a second multivariate data comprising values at the set of main dimensions, wherein:
the second multivariate data has a second additional data comprising values in a second set of sub-dimensions, and
the second set of sub-dimensions is associated with a second predicate value at a second predicate dimension of the set of main dimensions;
presenting a second option item to represent the second predicate value near a parallel axis in the set of parallel main axes that corresponds to the second predicate dimension of the set of main dimensions;
upon receiving a selection of the second option item, unfolding the parallel coordinate visualization to reveal a second set of parallel sub-axes that correspond to the second set of sub-dimensions; and
presenting the second additional data of the second multivariate data at the second set of parallel sub-axes.

15. The computer program product of claim 14, wherein unfolding the parallel coordinate visualization to reveal the first and second sets of parallel sub-axes comprises:
visually expanding the first predicate dimension to encompass the first set of parallel sub-axes near the first predicate value; and
visually expanding the second predicate dimension to encompass the second set of parallel sub-axes near the second predicate value.

16. A computing device comprising:
a display device;
a processor; and
a storage device storing a set of instructions, wherein an execution of the set of instructions by the processor configures the computing device to perform acts comprising:
presenting, at the display device, a parallel coordinate visualization that comprises a set of parallel main axes that respectively correspond to a set of main dimensions;
receiving a first multivariate data comprising values at the set of main dimensions, wherein:
the first multivariate data has a first additional data comprising values in a first set of sub-dimensions, and
the first set of sub-dimensions is associated with a first predicate value at a first predicate dimension in the set of main dimensions;
presenting, at the display device, the first multivariate data as a first polyline that intersects the set of parallel main axes;
presenting, at the display device, the parallel coordinate visualization to reveal a first set of parallel sub-axes that correspond to the first set of sub-dimensions upon receiving a selection of a first option item; and
presenting, at the display device, the first additional data of the first multivariate data at the first set of parallel sub-axes, wherein the first polyline also intersects each of the parallel sub-axes that correspond to the first set of sub-dimensions.

17. The computing device of claim 16, wherein presenting the parallel coordinate visualization to reveal the first set of parallel sub-axes comprises visually expanding, at the display device, the first predicate dimension to encompass the first set of parallel sub-axes.

18. The computing device of claim 16, wherein the first set of parallel sub-axes and the set of parallel main axes are interconnected by the first polyline representing the first multivariate data.

19. The computing device of claim 16, wherein an instruction of the set of instructions by the processor further configures the computing device to perform acts comprising:
receiving a second multivariate data comprising values at the set of main dimensions, wherein:
the second multivariate data has a second additional data comprising values in a second set of sub-dimensions, and
the second set of sub-dimensions is associated with a second predicate value at a second predicate dimension of the set of main dimensions;
presenting, at the display device, the parallel coordinate visualization to reveal a second set of parallel sub-axes that correspond to the second set of sub-dimensions upon receiving a selection of a second option item; and
presenting, at the display device, the second additional data of the second multivariate data at the second set of parallel sub-axes.

20. The computing device of claim 19, wherein unfolding the parallel coordinate visualization to reveal the first and second sets of parallel sub-axes comprises:
visually expanding the first predicate dimension to encompass the first set of parallel sub-axes near the first predicate value; and
visually expanding the second predicate dimension to encompass the second set of parallel sub-axes near the second predicate value.

* * * * *